United States Patent Office 2,950,649
Patented Aug. 30, 1960

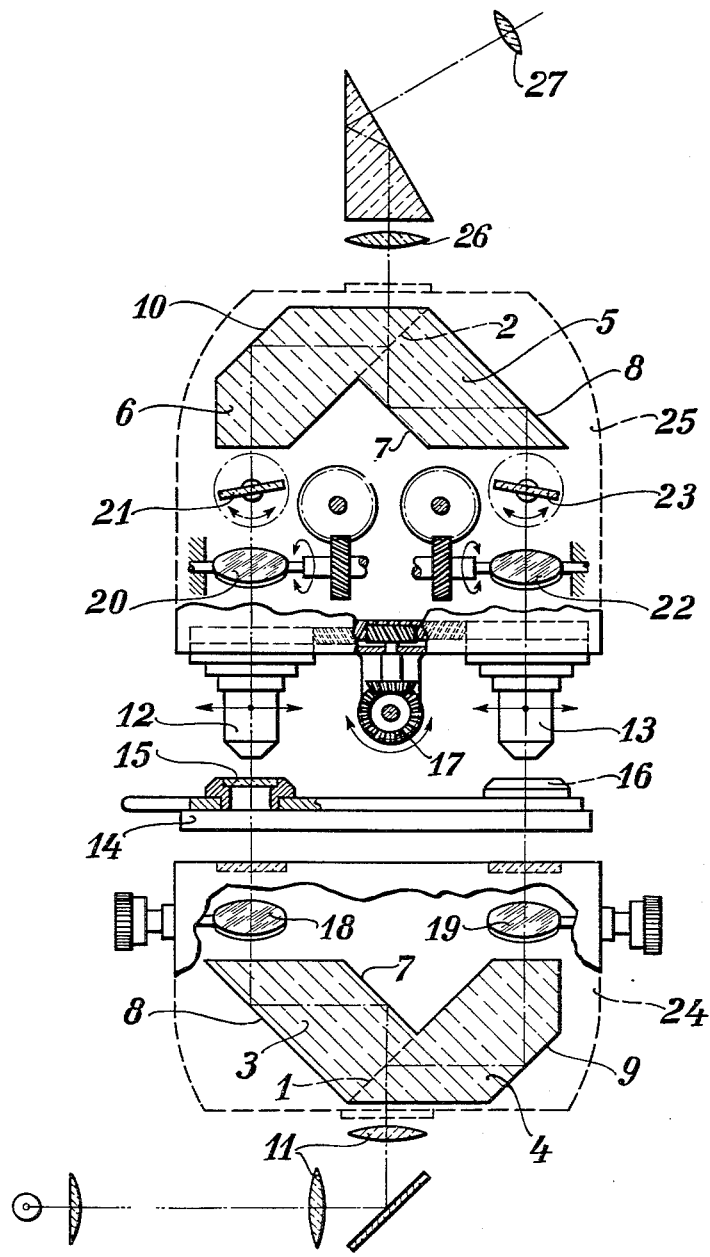

2,950,649

INTERFERENCE MICROSCOPE WITH TRANSMITTED ILLUMINATION

Willi Horn, Wetzlar, Germany, assignor to Ernst Leitz G.m.b.H., Wetzlar, Germany, a corporation of Germany Filed July 24, 1956, Ser. No. 599,838

Claims priority, application Germany Aug. 2, 1955

4 Claims. (Cl. 88—39)

The present invention relates to interferometers, and more particularly to an interference microscope with transmitted illumination.

Michelson interferometers may be used to obtain enlarged images of an object by adding objectives thereto. However, this can be done only if the object reflects, i.e. if it can be observed with top-light illumination. In the case of transmitted illumination, Mach-Zehnder interferometers are preferred. However, microscopes with such interferometers require two objectives in each one of the coherent beams, one serving to form the image and the other one as condenser. This requirement for four accurately identical objectives is very difficult to meet because the optical paths in all objectives must be the same down to a fraction of a wave length. If condensers of large aperture are used, each one of the beams contains rays which have traversed paths of different lengths in the object, which disturbs the interference. Therefore, a compromise must be made between the size of the illuminating aperture, i.e. the useful magnification, and the exactness of the interference pattern.

If objectives with large apertures are used to form the image of the object, the illumination may still be effected with condensers of long local length and small aperture, particularly with a condenser which is common to both beams and is arranged before the beam divider. All that is needed then between the beam divider and the beam joiner are two identical objectives and the pivotable plane parallel plates serving to form the interference fringe distances and inclinations.

In one preferred embodiment, the arrangement is constructed symmetrically in respect of the direction of the light incidence by giving the light beam emerging from the beam joiner the same direction as that of the light incidence. This makes it possible to make the interferometer of the invention as an attachment or accessory to a conventional microscope stand.

The invention will be more fully explained in the following detailed description of a preferred embodiment taken in conjunction with the drawing showing a side view of the device.

As shown the light beam from a source of light enters the optical system through condenser lenses 11 arranged in front of beam dividing plane 1 between prisms 3 and 4. The prism 3 has two fully reflective planes 7 and 8 while prism 4 has only one such plane 9.

An identical prism arrangement is provided at the other side of the object, such arrangement comprising beam divider plane 2, which is parallel with plane 1 and lies between prisms 5 (which is identical with prism 3) and 6 (which is identical with prism 4), the latter prism having fully reflective plane 10 while prism 5 has fully reflective planes 7, 8.

As indicated in the drawing, plane 1 divides the beam into two coherent light bundles which pass through objectives 12 and 13, respectively. Stage 14 supports object slides 15 and 16 arranged in each light bundle, the slides being identical in accordance with the requirements of interference optics to make the optical path lengths of the two light bundles equal. The objectives may be transversely adjusted by means of gear drive 17 while the vertical adjustment of the light beams is effected by means of pivotable plane parallel plates 18 and 19. The width and inclination of the interference fringes is effected by means of Jamin's compensator plate pairs 20, 21 and 22, 23, which are also pivotably mounted.

All of the above-described parts are mounted respectively in housings 24 and 25 which are rigidly connected by connecting elements (not shown).

A tube lens 26 is mounted on top of housing 25 and an eye piece 27 is placed above the tube lens.

While the invention has been described in connection with a preferred embodiment, it will be understood that many variations and modifications may occur to those skilled in the art, particularly after benefiting from the present teaching, without departing from the spirit and scope of the invention as defined in the appended claims.

What I claim is:

1. An interference microscope for the examination of an object with transmitted illumination, comprising, in combination, a stage, a source of light, beam dividing means arranged in the path of the beam of said source of light for dividing the beam into two beams, at least three light reflecting surfaces arranged to form the two beams into parallel light beams throughout the length of such beams, pivotal plane parallel plates mounted above said beam dividing means in the paths of said beams for vertical adjustment thereof, small aperture condenser means, means for supporting the object on said stage in at least one of said parallel light beams, two parallel identical objectives adjacent the stage and arranged in the path of said parallel light beams, a pair of compensator plates mounted in the path of each light beam, the axis of one plate of each pair extending at right angles to the axis of the other plate of a pair, and all of said plates having an axis at right angles to the axes of said light beams, an eye-piece and a tube lens, and beam combining means, identical with said beam dividing means, arranged between the objectives and the eye-piece, said beam combining means including reflective surfaces in the paths of said parallel light beams and a single beam combining surface receiving the two light beams from said reflective surfaces and transmitting them without relative phase displacement as a single beam to said tube lens and then to the eye-piece; the beam dividing means, the light reflecting means, the object supporting means, the objectives and the beam combining means cooperating to make the optical paths of the two light beams after they are combined of equal length and intensity.

2. The interference microscope of claim 1, wherein the beam dividing means and the beam combining means each includes a beam dividing surface and a beam combining surface, respectively, each surface being inclined in relation to the incident light beam, the connecting line between the centers of the two surfaces having the same direction as the light beam impinging upon the first beam dividing surface.

3. The interference microscope of claim 1, wherein the beam dividing surface and the beam combining surface are parallel to each other.

4. An interference microscope for the examination of an object with transmitted illumination comprising, in combination, a stage, a source of light, a beam dividing prism system for dividing the beam into two beams, said prism system including one prism with two fully reflective surfaces and another prism with one fully reflective surface, a beam dividing surface arranged between the two prisms in the path of the light beam and reflecting one part of the beam toward said one fully reflective surface of said other prism while transmitting the other part of said beam toward one of the said two fully reflective surfaces of the one prism, whence it is reflected toward the second one of said two reflective surfaces, said one reflective surface of the other prism and the second reflective surface of said one prism forming said beam parts into two parallel light beams, small aperture condenser means, means for supporting the object on said stage in at least one of said parallel light beams, two parallel identical objectives adjacent the stage and arranged in the paths of said parallel light beams, a tube lens, an eye-piece, and a beam combining prism system identical with said beam dividing prism system and arranged between the objectives and the tube lens, the one fully reflective surface of said other prism of the beam combining prism system being in the path of the light beam coming from the second one of said two reflective surfaces of the one prism of the beam dividing prism system, the second reflective surface of said one prism of the beam combining prism system being in the path of the light beam coming from the one reflective surface of said other prism of the beam dividing system and the beam combining surface of the beam combining prism system receiving the two light beams from the reflective surfaces and transmitting them without relative phase displacement as a single beam to the tube lens and then to the eye-piece; said beam dividing prism system, said object supporting means, said objectives and said beam combining prism system cooperating to make the optical paths of the two combined light beams of equal length and intensity.

References Cited in the file of this patent

UNITED STATES PATENTS

| | | |
|---|---|---|
| 1,650,646 | Ott | Nov. 29, 1927 |
| 2,660,922 | Philpot | Dec. 1, 1953 |
| 2,669,901 | Rehorn | Feb. 23, 1954 |
| 2,741,946 | Rantsch | Apr. 17, 1956 |
| 2,770,166 | Gabor | Nov. 13, 1956 |